G. C. WAGNER.
CAR AXLE.
APPLICATION FILED SEPT. 13, 1915.
1,175,093.
Patented Mar. 14, 1916.
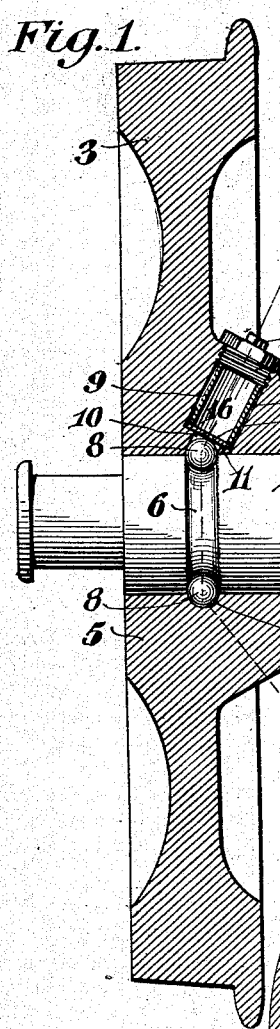
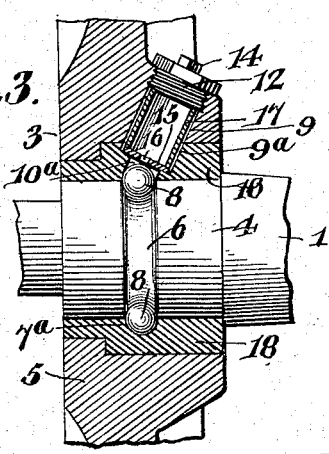
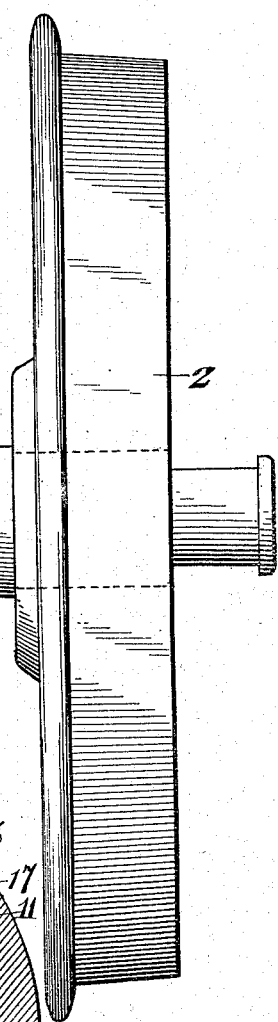
George C. Wagner,
INVENTOR
WITNESSES:
BY
Attorney

UNITED STATES PATENT OFFICE.

GEORGE C. WAGNER, OF DENVER, COLORADO, ASSIGNOR OF ONE-HALF TO FREEMAN H. BERGER, OF DENVER, COLORADO.

CAR-AXLE.

1,175,093.

Specification of Letters Patent.

Patented Mar. 14, 1916.

Application filed September 13, 1915. Serial No. 50,427.

*To all whom it may concern:*

Be it known that I, GEORGE C. WAGNER, a citizen of the United States, residing at Denver, in the county of Denver and State of Colorado, have invented a new and useful Car-Axle, of which the following is a specification.

This invention has reference to car axles, and its object is to provide a car axle with car wheels thereon having one of the car wheels capable of rotation independently of the rotation of the axle, so that the car axle may travel upon curved portions of the track without slippage of one or the other of the wheels on the track.

In accordance with the present invention one of the car wheels is made permanently fast to the axle so as to always turn with the axle. The other car wheel, however, is so mounted on the axle as to be capable of rotation about the axle independently thereof. In order to retain the loose wheel upon the axle both the axle and the terior of the hub of the wheel are circumferentially grooved with one groove matching the other and together constituting the race-way for balls. Provision is made by suitable passages leading to the ball race to insert the balls until the race is full, and then plugs are applied to the passages with composite lubricant cups, whereby the ball race is kept supplied with lubricant. This is accomplished irrespective of the rotation of the wheel about the axle by having at least three lubricant receptacles disposed equi-distantly about the hub of the wheel in order that one or more of the receptacles be above a horizontal plane cutting the axis of the wheel, so that some lubricant will always gravitate toward the ball race. The lubricant receptacles are held in the passages by the plugs and in turn close those parts of the passages leading into the ball race, so that there is no liability of the balls escaping into the passages.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—Figure 1 is an elevation of a car axle with the tight wheel in elevation and the loose wheel in diametric section. Fig. 2 is a section on the line 2—2 of Fig. 1 drawn on a larger scale, and omitting distant parts. Fig. 3 is a section of the hub portion of the loose wheel similar to the section of Fig. 1, but showing a somewhat different arrangement from Fig. 1.

Referring to the drawings there is shown an axle 1 such as is customarily employed in connection with car trucks, and this axle is provided with a wheel 2 fast thereto as is customary in car axles. There is also shown another car wheel 3 mounted upon a spindle 4 of the car axle, the wheel having a hub 5 fitted to the spindle 4 so as to turn thereon. The spindle 4 is formed about midway of its length with a circumferential groove 6 of about semi-circular form in cross-section and the hub 5 is formed with a similar groove 7 of semi-circular cross-section matching the groove 6. The two grooves when the wheel 3 is mounted on the spindle 4 define a circular ball race designed to receive anti-friction balls 8 and the ball race and balls may be so proportioned that a suitable number of balls of the proper size will about fill the ball race after the manner of installing anti-friction balls in ball bearings.

The hub portion 5 of the wheel 3 is provided with radial passages 9 shown in the drawings as three in number spaced apart by about 120°. Each passage as shown is of considerably larger diameter than a ball 8 and has a reduced terminal portion 10 entering the ball race, whereby a circular ledge or shoulder 11 is produced at the inner end of each passage 9. The outer end of the passage is screw threaded for the reception of a screw plug 12 having a central threaded passage 13 therethrough normally closed by a screw 14 serving as a plug for the passage 13. In each passage 9 there is lodged a washer 15 against the shoulder 11, and this washer is provided with a small perforation 16 constituting an oil passage and opening into the passage or neck 10. Seated loosely in each passage 9 is a sleeve 17 which is of a length to extend from the plug 12 to the washer 15, so that when the plug 12 is seated in the outer threaded end of a passage 9 the washer 15 is firmly seated against the shoulder or ledge 11. The sleeve 17 with the plug 12 at one end and the washer 15 at the other constitutes a cup or receptacle for lubricant.

When the axle 1 and wheel 3 are assembled one of the plugs 12 with the washer 15 and sleeve 17 may be removed if already in place and the balls 8 are dropped through the open passage 9 which may be in the upper position, and such balls gravitate into the ball race-way and ultimately fill the latter, after which a washer 15 is placed in the open passage 9 to be followed by a sleeve 17 and finally the washer and sleeve are clamped in place and the passage 9 closed by a plug 12. The lubricant receptacles thus provided may be supplied from time to time with oil or other suitable lubricant through the passages 13, the screws 14 being removed for the purpose.

The balls serve as a circular or ring-like key for retaining the loose wheel in place upon the axle against any possibility of escape and with the same certainty as though the wheel were shrunk upon the axle. At the same time the wheel is free to rotate and does rotate independently of the axle whenever circumstances demand a difference in speed of rotation between the two wheels of the axle.

Ordinarily the wheels rotate at about the same speed, so that there is little or no difference of movement between the loose wheel and the axle, but where there is a difference in distance of travel between the two wheels, as on a curve, the wheel 2 and axle 1 will rotate either faster or slower than the wheel 3. While the balls 8 are not intended to support the wheel 3 as an anti-friction bearing therefor, the friction which might occur between a retaining key, ring or washer and the loose wheel is very much reduced. With the device of the present invention the benefits of the loose wheel are obtained with practically negligible wear since the infrequent turning of the wheel on the axle or the axle in the wheel is not productive of noticeable wear, except after long service. The facility with which lubricant is applied and the certainty of lubrication irrespective of the location of the wheel upon the axle also aids in reducing wear.

In the structure shown in Figs. 1 and 2 the wheel hub bears directly upon the axle spindle, so that should wear occur and it is not advisable to scrap the car axle and wheels, provision must be made for taking up the wear. This may be done in the wheel as originally built by counterboring the hub portion 5 and forcing in a wear bushing 18 of brass or other suitable material having a portion of the ball race formed therein, as indicated at 7ª matching the portion 6 of the ball race formed in the spindle 4 of the axle 1. Each passage 9 in the wheel hub has a continuation 9ª into the bushing 18 and the neck continuation of the passage 9ª into the ball race section 7ª, as indicated in Fig. 3 at 10ª. In case of wear such as to be noticeable, the bushing 18 may be replaced by another properly fitted bushing. The bushing also permits fitting the wheel to a smaller axle if desired.

With some car trucks it is advisable to have the oil cups open on the outside instead of on the inside of the wheel and of course the invention contemplates such a change and other structural changes as would properly come within the range of mechanical skill.

Since the wheels turn independently of each other there is no slipping of either wheel on the track on rounding curves and danger of derailment is avoided. Nor is there loss of power due to the drag of one or the other of the wheels on the track as occurs when both wheels are fast to the axle.

What is claimed is:—

1. A car axle structure comprising a car axle with a car wheel mounted to turn freely thereon, the axle and wheel having matching grooves together constituting a circular ball race, and the hub of the wheel being provided with the passages leading into the ball race, balls lodged in the ball race and constituting an antifriction circular key for holding the wheel upon the axle, a washer in each passage in the wheel hub at the end of the passage next to the ball race, a sleeve lodged in the passage in the hub against the washer, and a plug closing the outer end of each passage and provided with a removable closure for the introduction of lubricant into the sleeve in the passage.

2. A car axle structure comprising a car axle with a wheel mounted to turn freely thereon, the wheel hub and car axle having coacting matching grooves constituting a ball race, a circular series of balls lodged in the ball race and constituting a circular key for holding the wheel on the axle, and said wheel having a circular series of passages in its hub leading into the ball race and each of a size to permit the passage of the balls therethrough, and lubricant containers adapted to and contained in the passages in the hub of the wheel and also serving as ball retainers holding the balls to the ball race.

3. A car axle structure comprising an axle with a wheel mounted to turn freely thereon, a circular key connecting the wheel and axle and consisting of anti-friction balls with the wheel and axle having coacting grooves constituting a ball race, and the car wheel having passages leading to the ball race and lubricant receptacles lodged in the passages and constituting retainers for the balls holding them against escape from the ball race through the passages.

In testimony, that I claim the foregoing as my own, I have hereto affixed my signature in the presence of two witnesses.

GEORGE C. WAGNER.

Witnesses:
GENEVIEVE GEGG,
THOMAS E. WATTERS.

Copies of this patent may be obtained for five cents each, by addressing the "Commissioner of Patents, Washington, D. C."